United States Patent
Stellwag et al.

(10) Patent No.: US 9,235,456 B2
(45) Date of Patent: Jan. 12, 2016

(54) CONFIGURATION TECHNIQUE FOR AN ELECTRONIC CONTROL UNIT WITH INTERCOMMUNICATING APPLICATIONS

(71) Applicant: ELEKTROBIT AUTOMOTIVE GmbH, Erlangen (DE)

(72) Inventors: Claus Stellwag, Markt Erlbach (DE); Daniel Kerk, Nuremberg (DE)

(73) Assignee: ELEKTROBIT AUTOMOTIVE GMBH, Erlangen (DE)

(*) Notice: Subject to any disclaimer, the term of this patent is extended or adjusted under 35 U.S.C. 154(b) by 0 days.

(21) Appl. No.: 13/969,018

(22) Filed: Aug. 16, 2013

(65) Prior Publication Data

US 2014/0053165 A1      Feb. 20, 2014

(30) Foreign Application Priority Data

Aug. 17, 2012 (DE) .......................... 10 2012 016 539

(51) Int. Cl.
   *G06F 9/54*       (2006.01)
   *G05B 19/042*  (2006.01)
   *G05B 19/04*    (2006.01)

(52) U.S. Cl.
   CPC ............ *G06F 9/544* (2013.01); *G05B 19/0426* (2013.01)

(58) Field of Classification Search
   None
   See application file for complete search history.

(56) References Cited

U.S. PATENT DOCUMENTS

| 7,152,231 | B1 * | 12/2006 | Galluscio et al. | 719/312 |
| 2002/0144010 | A1 * | 10/2002 | Younis et al. | 709/314 |
| 2011/0289294 | A1 * | 11/2011 | Maeda et al. | 711/163 |

OTHER PUBLICATIONS

"Autosar", Technical Overview, V2.2.2, R3.2, Rev 1, pp. 1-41, Apr. 27, 2011.

* cited by examiner

*Primary Examiner* — Andy Ho
*Assistant Examiner* — Abdou Seye
(74) *Attorney, Agent, or Firm* — Westerman, Hattori, Daniels & Adrian, LLP

(57) ABSTRACT

A technique is specified for configuring an electronic control unit having intercommunicating applications which have been arranged in various partitions and to which differing safety integrity levels have been assigned. According to one method aspect, the communications behavior of the applications assigned to the differing partitions amongst themselves is analyzed, in order to identify data-writing and data-reading applications that are not located in the same partition. Subsequently, a shared memory area for the intercommunicating applications is configured, and a to communications data structure for the applications is generated. The communications data structure is at least partially arranged in the shared memory area.

22 Claims, 9 Drawing Sheets

CONFIGURATION TECHNIQUE FOR AN ELECTRONIC CONTROL UNIT WITH INTERCOMMUNICATING APPLICATIONS

TECHNICAL FIELD

The present disclosure relates generally to the technical field of electronic control units. More precisely, a technique is specified in order to configure an electronic control unit with regard to intercommunicating electronic-control-unit applications. The technique can be implemented in the form of a method, a computer-program product, an apparatus or an electronic control unit.

BACKGROUND

The term 'embedded system' designates a combination including a processor and software executed thereon which have been integrated within a technical application context. In this connection, the processor undertakes, for example, monitoring functions, open-loop control functions or closed-loop control functions. In many cases the processor is responsible, in addition, for signal conditioning or data preparation. Modern embedded systems may also comprise several processors.

As an example of embedded systems, electronic control units (ECUs) may be mentioned. Electronic control units are electronic modules which are used in the automotive field, but also in machines and installations for control purposes, as well as for further tasks.

In motor vehicles, electronic control units are used, for example, in connection with electronic engine management. Electronic control units also come into operation for purposes such as the evaluation of signals of speed sensors, tank-level sensors or oil-pressure sensors and the corresponding drive of display instruments. In addition, electronic control units are integrated for use in automatic system interventions, for instance for the purpose of steering assistance (electronic power steering, EPS) or in connection with a driving-stability system (electronic stability program, ESP). With a view to reciprocal exchange of information, electronic control units may have been networked to one another via a system bus (e.g. in accordance with the CAN, LIN, MOST or FlexRay standard).

With the advent of electronic components into automotive engineering, the number of electronic control units integrated within a vehicle has increased greatly in recent years. Accordingly, the effort for the networking of the electronic control units has also risen. There have been similar developments also in mechanical engineering and plant engineering. For this reason it has been contemplated to pack various applications within a single electronic control unit. In this way, not only is it possible to reduce the number of built-in electronic control units, but the networking effort and the costs can also be lowered. On the other hand, new safety problems arise.

For instance, it has been recognised that problems may occur when different applications integrated within a single electronic control unit are accessing the same memory area. For example, the access of a tachometer application to a stored wheel-speed value might conflict with the access of an ESP application to this value, and this conflict might then result in a situation that is critical in terms of safety. For this reason, various memory-protection concepts for electronic control units having several applications have been proposed.

One memory-protection concept can be implemented via the software of an operating system of the electronic control unit. For this purpose the electronic control unit frequently includes a separate hardware component in the form of a memory-protection unit (MPU, or memory-management unit (MMU)). The memory-protection unit may, for example, have been integrated within a processor of the electronic control unit, or may alternatively constitute a component that is separate from the processor.

Memory protection ordinarily serves for the realisation of rights of access to memory areas, and thereby enables the distinct separation of application processes from one another and from the operating system (over and above that, a support of virtual addresses is often also possible). In particular, memory protection can selectively block individual memory areas, also called partitions, for a writing operation (inclusive of a consuming readout).

In electronic control units on which several applications are running, the write-protection functionality is employed in targeted manner for the purpose of prohibiting applications of lower priority from manipulating memory areas that are also being accessed by applications of higher priority (and, where appropriate, conversely). For the prioritising of applications, recourse may be had to IEC Standard 61508 and also to ISO Standard 26262, derived therefrom. In IEC Standard 61508, for example, four safety-requirement levels or safety integrity levels (SIL) have been defined, namely SIL1 to SIL4. Each level is a measure of the necessary or attained risk-reducing effectiveness of a (safety-critical) function realised by means of a given application.

In a priority-based memory-protection implementation the physical memory of an electronic control unit may be subdivided into various partitions, with a certain safety integrity level being allocated to each partition. Memory accesses of electronic-control-unit applications can then be controlled in such a manner that in a first step the safety integrity level assigned to the accessing application is determined. The memory access (in any case, as far as write operations are concerned) is then restricted to the partition with the ascertained safety integrity level.

In connection with the implementation of a priority-based memory-protection concept a separate partition for applications to which no safety integrity level has been allocated can generally be provided. Furthermore, a jointly utilised memory (shared memory) can be used for the communication between applications of different safety integrity levels amongst themselves.

In order to facilitate the communication of electronic-control-unit applications amongst themselves and also the exchange of applications on different electronic control units, the AUTOSAR development partnership was brought into being. The AUTOSAR project is a continuation of the work of the OSEK standardisation committee.

A significant aspect of the AUTOSAR specification is the logical splitting of the software into electronic-control-unit-specific system software and electronic-control-unit-independent application software. A virtual function bus (VFB) connects all the intercommunicating software applications (software components, SWC), also beyond various electronic control units. The centrepiece of the AUTOSAR architecture is its run-time environment (RTE). This run-time environment is a communications layer based on the VFB, and uses ports for transmitter/receiver-oriented communicating between various applications and between an application and the operating system (and remaining system software) of the electronic control unit.

FIG. 1 shows schematically the memory partitioning and memory-based communication for an electronic control unit in connection with the implementation of a priority-based memory-protection concept in the AUTOSAR environment.

In the exemplary case the memory has been split up into three partitions, namely two 'non-privileged' partitions 10, 20 and one 'privileged' partition 30.

The two partitions 10, 20 each include the software code of an application SWC1 and SWC2, respectively, in which connection differing safety integrity levels have been allocated to the two applications SWC1, SWC2 (or to the two partitions 10, 20). Furthermore, each of the two partitions 10, 20 includes an area of private data 40, 50 assigned to the respective application SWC1, SWC2, and also the software code of a run-time environment 60, 70 assigned to the respective application. Read operations and write operations with respect to the areas of private data 40, 50 are undertaken in a non-privileged mode (also called user mode) of a processor on which the software code of the applications SWC1, SWC2 is running. On the processor, which is not represented in FIG. 1, the software code of the run-time environments 60, 70 and of the operating system is also executed.

The third partition 30 includes a shared memory 80 for communication between the two applications SWC1, SWC2. The shared memory 80 takes the form of a buffer or queue. Read operations and write operations with respect to the shared memory 80 are possible only in a privileged mode of the processor.

For the purpose of communication between the two applications SWC1, SWC2 via the shared memory 80, a system call of the respective run-time environment 60, 70 via a programming interface (application programming interface, API) to the operating system which is not represented in FIG. 1 is required. The operating system is, inter alia, responsible for configuring a memory-protection unit of the processor dynamically in accordance with the system call.

If, as illustrated in FIG. 1, application SWC1, for example, wishes to write data from the area of private data 40 into the shared memory 80, in a first step a write request to the run-time environment 60 is made. The run-time environment 60 thereupon makes a system call to the operating system. The operating system writes, in the privileged mode, the data from the area of private data 40 into the memory 80. From there, the data can then be read out by application SWC2.

If, in a next step, application SWC2 wishes to read the data written by application SWC1, for example into the area of private data 50, once more in a first step a read request from application SWC2 to the assigned run-time environment 70 is required. The run-time environment 70 then makes a system call to the operating system. The operating system thereupon checks whether data are present in the memory 80. It then reads out the data—if present—in the privileged mode and delivers them back, in order that they can be written to the area of private data 50. In case no data were to be present in the memory 80, an error message (as a rule, with an error code) is returned.

The communication, sketched in FIG. 1, taking place within an electronic control unit between the applications SWC1, SWC2 on the basis of the shared memory 80 is unsatisfactory from various viewpoints. On the one hand, system calls to the operating system and the associated copying of data or configuring of the memory-protection unit are computationally intensive from the perspective of the processor. On the other hand, for the run-time environments 60, 70 additional wrapper functions are ordinarily required which increase the flash-memory requirement.

Brief Outline

Accordingly, a technique for configuring an electronic control unit having intercommunicating applications is to be specified that avoids one or more of the disadvantages described above.

According to a first aspect, a method for configuring an electronic control unit for intercommunicating applications is made available, wherein a memory assigned to the electronic control unit has been split up or is split up into partitions, and wherein at least one application with a first safety integrity level has been assigned to a first partition, and at least one application with a second safety integrity level, different from the first safety integrity level, or with no safety integrity level, has been assigned to a second partition. The method comprises the steps of analysing a communications behaviour of the applications assigned to the differing partitions amongst themselves, in order to identify a data-writing application and at least one application reading the written data, said applications not being located in the same partition, and of configuring a shared memory area in the partition of the writing application, and of generating a communications data structure for a communication between the data-writing application and the data-reading application, the communications data structure being provided for at least partial arrangement in the shared memory area.

The method according to the first aspect may come into operation, for example, when a writing application is confronted with one or more reading applications. This corresponds generally to a communications ratio of 1:n (n=1, 2, . . . ) between writing and reading applications.

At least the two steps of analysing and of configuring may be carried out offline—that is to say, in the approach to the run-time of the applications. For example, these steps may be undertaken in connection with the creating of a configuration file to be loaded into the electronic control unit. Moreover, a memory-protection unit of the electronic control unit can (e.g. during the run-time) be configured in such a manner that the reading application during its run-time is given only read access, but not write access, to the communications data structure. In this connection, a write access, for example, to the partition of the writing application (in which the shared memory area with the communications data structure is situated) can be prevented.

According to one implementation, the shared memory area has been configured as a buffer memory. Additionally or as an alternative, the communications data structure may have been designed as a queue for communication between the two applications. Generally, a first part of the communications data structure can be configured in the shared memory area in the partition of the writing application, and a second part of the communications data structure can be configured in another memory area outside the partition of the writing application. This other memory area may be formed in the partition of the reading application.

The first part of the communications data structure may be configured for storing at least the written data. The second part of the communications data structure may, on the other hand, have been configured for storing at least one read pointer.

According to one version, two or more of the applications reading the written data have been provided. In this case, for each reading application a separate communications data structure, for example configured as a queue, can be provided. The two or more applications reading the written data may have been assigned to differing partitions (and hence also to differing safety integrity levels).

According to a second aspect, a method for configuring an electronic control unit for intercommunicating applications is specified, wherein a memory assigned to the electronic control unit has been split up or is split up into partitions, and wherein at least one application with a first safety integrity level has been assigned to a first partition, at least one application with a second safety integrity level, different from the first safety integrity level, has been assigned to a second partition, and at least one application with a third safety integrity level, different from the first and second safety integrity levels, or with no safety integrity level, has been assigned to a third partition. The method comprises the steps of analysing a communications behaviour of the applications assigned to the differing partitions amongst themselves, in order to identify at least two data-writing applications and an application reading the written data, said applications not all being located in the same partition, and of configuring a shared memory area in the memory outside the first, second and third partitions, and also of generating a communications data structure for a communication between the data-writing applications and the data-reading application, the communications data structure being provided for at least partial arrangement in the shared memory area.

The method according to the second aspect may come into operation, for example, when several writing applications are confronted with one reading application. This corresponds generally to a communications ratio of n:1 (n=2, 3, . . . ) between writing and reading applications.

As already described above in connection with the first method aspect, at least the analysing and the configuring can be carried out offline. A memory-protection unit of the protection appliance can (e.g. during the run-time) be configured in such a manner that the writing applications during their run-time are given write access, and the reading application during its run-time is given only read access, but not write access, to the communications data structure.

In the case of the second method aspect, the shared memory area can be established in a fourth partition.

The shared memory area may, according to each of the two process aspects, be an area of private data. The communications data structure may, for example, be a buffer memory (e.g. a ring buffer) and/or a queue. In the course of generating the communications data structure, a size and/or an address of the data structure can be defined.

Within the framework of the methods presented here, a run-time environment can be generated (e.g. in the form of source code or object code). The run-time environment may serve to decouple a function call of an application from an access to the communications data structure. In other words, the run-time environment can act as an interface between one of the applications and the communications data structure that has been assigned to the application.

Both method aspects may furthermore include the step of receiving information relating to the assignment between partitions and applications, and also relating to the communications behaviour of the applications. The step of analysing the communication paths may in this case be undertaken on the basis of the received information. The information may, for example, be received in the form of a file or as user input.

The configuring of the shared memory area and the generating of the communications data structure can generally be undertaken in connection with the creating of compilable configuration data (e.g. in the form of source code). The configuration data may have been split up in partition-specific manner (that is to say, for example, they may contain several files or data sets which have each been allocated to a certain partition).

Besides the configuration data, application data can also be compiled that contain the applications (e.g. in the form of source code). The application data may contain calls to the data to be read and written. Like the configuration data, the application data may also have been split up in partition-specific manner.

The compiled configuration data can be linked with the compiled application data (e.g. in the form of object code). The linking may be carried out on the basis of information that specifies which application data are to be mapped onto which partitions.

The configuration data alone or the linked data can be loaded (e.g. as a configuration file) into the electronic control unit. Subsequent to this, the electronic control unit has been configured for the communication of the applications amongst themselves.

The applications can generally communicate with one another in accordance with a predetermined specification. This communication may, for example, be undertaken on the basis of the AUTOSAR specification.

Furthermore, a computer-program product with program-code means is made available for implementing the method aspects presented here when the computer-program product is executed on one or more processors. The computer-program product may have been stored on a storage medium (for example, a flash memory). The storage medium may be part of an electronic control unit.

Likewise specified is an electronic control unit configured in accordance with the process presented here. The electronic control unit can be configured, for example, by loading of the aforementioned linked data into the electronic control unit.

According to a further aspect, an apparatus for configuring an electronic control unit for intercommunicating applications is made available, wherein a memory assigned to the electronic control unit has been split up or is split up into partitions, and wherein at least one application with a first safety integrity level has been assigned to a first partition, and at least one application with a second safety integrity level, different from the first safety integrity level, or with no safety integrity level, has been assigned to a second partition. The apparatus includes an analysis device which has been designed for analysing a communications behaviour of the applications assigned to the differing partitions amongst themselves, in order to identify a data-writing application and at least one application reading the written data, said applications not being located in the same partition. The apparatus further includes a configuration device which has been set up for configuring a shared memory area in the partition of the writing application and for generating a communications data structure for a communication between the data-writing application and the data-reading application, the communications data structure having been provided for at least partial arrangement in the shared memory area.

Furthermore, an apparatus is made available for configuring an electronic control unit for intercommunicating applications, wherein a memory assigned to the electronic control unit has been split up or is split up into partitions, and wherein at least one application with a first safety integrity level has been assigned to a first partition, at least one application with a second safety integrity level, different from the first safety integrity level, has been assigned to a second partition, and at least one application with a third safety integrity level, different from the first and second safety integrity levels, or with no safety integrity level, has been assigned to a third partition. The apparatus includes an analysis apparatus which has been set up for analysing a communications behaviour of the applications assigned to the differing partitions amongst themselves, in order to identify at least two data-writing applications and an application reading the written data, said applications not all being located in the same partition. The apparatus further includes a configuration device which has been set up for configuring a shared memory area in the memory outside the first, second and third partitions and for generating a communications data structure for a communication between the data-writing applications and the data-reading application, the communications data structure having been provided for at least partial arrangement in the shared memory area.

Further made available is an electronic control unit having intercommunicating applications. The electronic control unit includes a memory which has been split up into partitions, wherein at least one application with a first safety integrity level has been assigned to a first partition, and at least one application with a second safety integrity level, different from the first safety integrity level, or with no safety integrity level, has been assigned to a second partition, wherein a data-writing application and at least one application reading the written data have been stored in the memory, said applications not being located in the same partition, and wherein the memory includes a shared memory area in the partition of the writing application and a communications data structure for a communication between the data-writing application and the data-reading application, the communications data structure having been arranged at least partially in the shared memory area. The electronic control unit further includes a memory-protection device which has been configured in such a manner that the reading application during its run-time has only read access, but not write access, to the communications data structure.

According to another aspect, a further electronic control unit having intercommunicating applications is specified. The electronic control unit includes a memory which has been split up into partitions, wherein at least one application with a first safety integrity level has been assigned to a first partition, at least one application with a second safety integrity level, different from the first safety integrity level, has been assigned to a second partition, and at least one application with a third safety integrity level, different from the first and second safety integrity levels, or with no safety integrity level, has been assigned to a third partition, wherein at least two data-writing applications and an application reading the written data have been stored in the memory, said applications not all being located in the same partition, and wherein the memory includes a shared memory area outside the first, second and third partitions and a communications data structure for a communication between the data-writing applications and the data-reading application, the communications data structure having been arranged at least partially in the shared memory area. The electronic control unit further includes a memory-protection unit which has been configured in such a manner that the writing applications during their run-time have write access, and the reading application during its run-time has only read access, but not write access, to the communications data structure.

The memory-protection unit of the respective electronic control unit can be configured appropriately when the operating system switches from one processing thread to another thread.

The electronic control unit may generally have been networked with other electronic control units via a system bus. The electronic control unit may furthermore generally have been designed for evaluating a sensor signal. Accordingly, the electronic control unit may include at least one input for a sensor signal to be processed.

The electronic control unit proposed here in each instance may be an electronic control unit of a motor vehicle.

BRIEF DESCRIPTION OF THE DRAWINGS

Further aspects, advantages and particulars of the configuration technique proposed here for an electronic control unit will become evident from the following description of the embodiments which will be elucidated with reference to the Figures. Shown are.

DETAILED DESCRIPTION

In the following description, for the purpose of elucidation but not of restriction, various technical details will be elucidated, in order to guarantee a fundamental understanding of the technique presented here. For a person skilled in the art it is evident that the present technique can be realised in other embodiments which diverge from the details described below. For example, the embodiments are described primarily within the context of C programming; however, this does not rule out employing other programming means.

Moreover it will be inferred by a person skilled in the art that the services, functions and steps presented below can be implemented using software code that has been provided in combination with a processor, or using an application-specific integrated circuit (ASIC), a digital signal processor (DSP) or an all-purpose computer. Although the embodiments below are described partially within the context of processes and apparatuses, the method presented here can likewise be realised in a computer-program product as software code (e.g. as source code or object code) and also in a system that includes a processor and a memory coupled to the processor, which contains the computer-program product.

Matching elements have been provided in the following embodiments with matching reference symbols.

Figure 2:
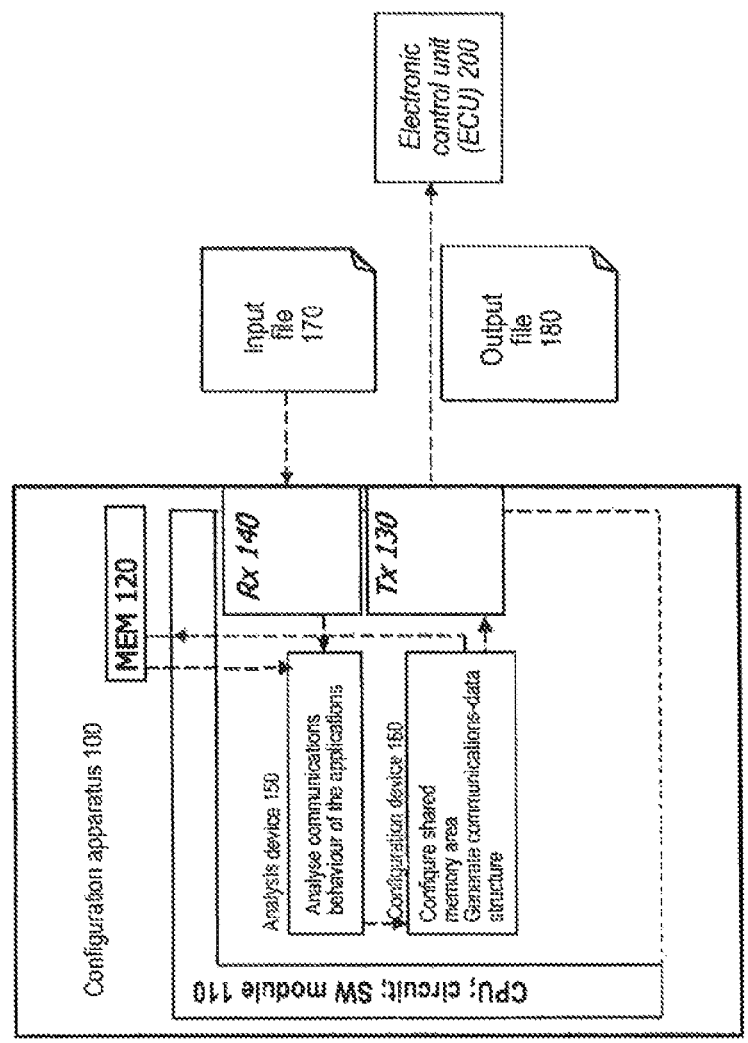
FIG. 2 a block diagram of a configuration apparatus according to an embodiment.

FIG. 2 shows an embodiment of a configuration apparatus 100 for an electronic control unit 200. It should be pointed out that the apparatus 100 may have been implemented as a conventional computer (e.g. as a workstation).

The apparatus 100 includes a core functionality 110 which may have been implemented as at least one processor (central processing unit, CPU), as a dedicated circuit (e.g. as an ASIC) and/or as a software module. Furthermore, the apparatus 100 includes a memory 120. In the memory 120, according to one implementation a computer-program product in the form of software code has been stored, which is executed by a core functionality 110 implemented as a processor. A transmitter 130 and a receiver 140 serve for communication of the apparatus 100 with another apparatus or with a user. Moreover, the apparatus 100 includes an analysis device 150 and a configuration device 160 communicating therewith.

As has been indicated by the dashed extension of the core functionality 110, the aforementioned devices 150, 160, which have been represented within the dashed lines, may have been implemented both as stand-alone devices and as subfunctionalities of the core functionality 110. The transmitter 130 and the receiver 140, which overlap the dashed area, may be driven by the core functionality 110, or may make information available to the core functionality 110.

In the embodiment according to FIG. 2 the receiver 140 has been set up in order to receive data (e.g. in the form of an input file 170) and to make them available to the analysis device 150. In like manner, the transmitter 130 has been set up to receive configuration data (e.g. in the form of an output file 180) from the configuration device 160 and to output them. The configuration data may, as illustrated in FIG. 2, be output indirectly or directly to the electronic control unit 200.

Figure 3:
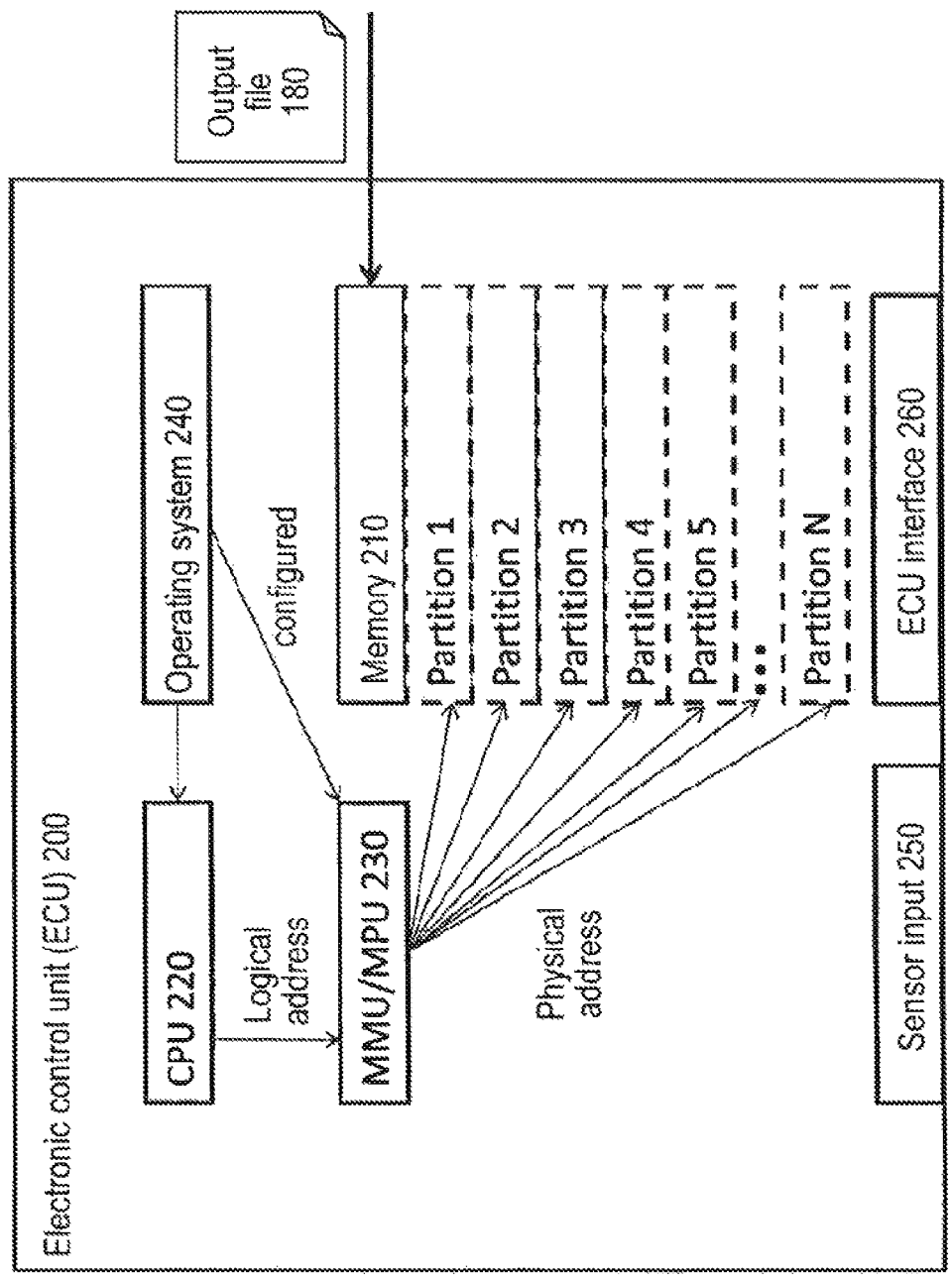
FIG. 3 a block diagram of an electronic control unit according to an embodiment.

FIG. 3 illustrates an embodiment of the electronic control unit 200 of FIG. 2. As shown in FIG. 3, the configuration data generated by the configuration apparatus 100 can be loaded into a memory 210 of the electronic control unit 200, in order to configure the electronic control unit 200 in suitable manner. The memory 210 may have been realised in differing ways. In particular, the memory 210 may have been split up into several separate hardware components. In the present embodiment the memory 210 includes at least one hardware component taking the form of flash memory.

The electronic control unit 200 shown in FIG. 3 includes, besides the memory 210, at least one processor 220 and also a memory-protection device 230. The memory-protection device 230 may have been integrated into the processor 220 or may constitute a hardware component that is separate from said processor. The memory-protection unit 230 has been arranged as an interface between the processor 220 and the memory 210. It converts memory accesses of the processor 220 that are based on logical addresses into memory accesses that are based on is physical addresses.

The memory-protection unit 230 is capable of being configured by an operating system 240 of the electronic control unit 200. The configuration of the memory-protection unit 230 serves for the realisation of a memory-protection concept with regard to the memory 210 which has been split up into several partitions. The memory-protection unit 230 is configured by the operating system 240 during the run-time of applications that have been stored in the memory 210.

In the present embodiment the electronic control unit 200 includes, in addition, a sensor input 250. Via the sensor input 250, sensor signals from one or more sensors can be received. Sensor signals can be processed by the applications that have been stored in the memory 210.

In an exemplary implementation the electronic control unit 200 may be an electronic control unit of a motor vehicle. In this case, for example, wheel-speed signals or engine-speed signals or temperature signals for further processing by suitable applications can be received via the sensor input 250. The electronic control unit 200 may, however, also generally come into operation in the case of machines or installations for control purposes.

Furthermore, an interface 260 to one or more further electronic control units (not represented in FIG. 3) has been provided. The electronic control units may have been networked with one another via a system bus. Suitable bus specifications were mentioned in the introduction.

Figure 4:
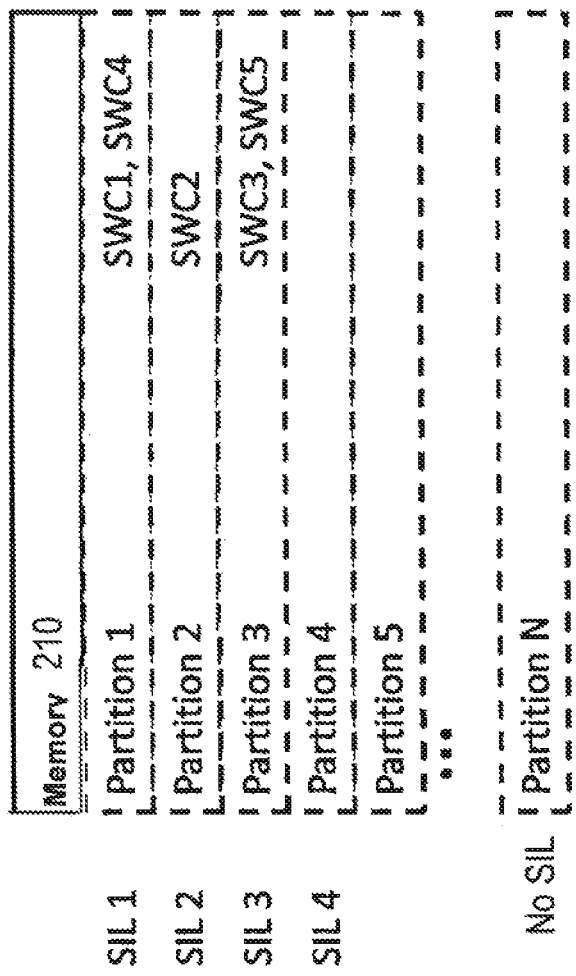
FIG. 4 a schematic diagram for illustrating the assignment, based on safety integrity levels, between memory partitions and applications in the case of the electronic control unit according to FIG. 3.

For the purpose of realising the memory-protection concept already mentioned, the memory 210, as shown in FIGS. 3 and 4, has been subdivided into a total of N partitions. In this way, for example, up to 8, up to 16 or up to 32 partitions may be provided. The memory-protection unit 230 guarantees, when the memory-protection concept is realised, that individual applications running on the electronic control unit 200 are each given only access to one or more predetermined partitions.

For the purpose of implementing a priority-based memory-protection concept, individual safety integrity levels have been assigned to the individual partitions, as illustrated in FIG. 4. In the present embodiment, in accordance with IEC Standard 61508 or ISO Standard 26262 a total of four safety integrity levels SIL1 to SIL4 have been assigned, whereby according to FIG. 4 safety integrity level SILn (n=1, 2, 3, 4) has been assigned to partition n. Furthermore, two or more further partitions 5, N have been provided. Deliberately, no safety integrity level has been assigned to partition N.

At this point it should be pointed out that the aforementioned IEC and ISO standards have merely been specified as examples, and the present disclosure can also be realised in connection with other prioritising concepts and associated safety integrity levels.

As shown in FIG. 4, various applications SWC1 to SWC5 according to the safety integrity level assigned to the respective application SWC1 to SWC5 have been distributed to the individual partitions of the memory 210. Accordingly, applications SWC1 and SWC4, to each of which safety integrity level SIL1 has been assigned, are located in partition 1, whereas application SWC2 with safety integrity level SIL2 is situated in partition 2, and applications SWC3 and SWC5 with, in each instance, safety integrity level SIL3, have been assigned to partition 3. Whenever in the present embodiment it is stated that an application has been arranged in a certain partition, by this it is meant that the compiled code of this application together with the compiled code of a run-time environment assigned to the application, and also the corresponding private data, have been stored in the defined partition.

In the present embodiment, no application is present to which safety integrity level 4 has been assigned or to which no safety integrity level has been assigned.

Accordingly, partitions 4 and N here are empty. It should be pointed out that specifically empty partitions in the memory 210 (in general) do not have to be configured. This means that, in many embodiments, partitions 4, 5 and N in the memory 210 may be dispensed with.

The individual applications can communicate with one another both within a partition and beyond partition boundaries. The communication between the applications is based, in the present embodiment, on the basis of the AUTOSAR specification with the special run-time environment thereof.

The communication of applications that are not all located in the same partition is undertaken via a shared memory area and a communications data structure provided in this memory area. Accordingly, one or more of the partitions illustrated in FIG. 4 may furthermore contain such a shared memory area with a communications data structure provided therein. The shared memory area may be situated in one of the partitions to which a safety integrity level SILn or specifically no safety integrity level has been assigned, and/or in a separate partition (e.g. in partition 5). Corresponding embodiments will be elucidated further below with reference to FIGS. 6 to 8.

Generally, the shared memory area within one of the partitions illustrated in FIG. 4 may, for instance in contrast to an area of private data, be accessible from an external partition.

The access may—depending on the implementation of the memory-protection concept—be restricted (e.g. only read access or only write access) or unrestricted (e.g. read/write access). The shared memory area may have been configured in various ways within the memory 210, for instance by means of a start address. Additionally or as an alternative, the configuration may also have been defined by means of an end address and/or a size of the memory area.

Furthermore, it is possible to configure the shared memory area indirectly via the location (e.g. start address and/or end address and/or size) of the partition in which the memory area is situated. To this extent, the configuring of the shared memory area may also generally include a configuring of the partition in which the shared memory area is situated or which forms the shared memory area. The shared memory area may in this case, depending on the particular application, constitute a part of a partition (for instance if the partition contains, besides the communications data structure, yet further elements such as an application), or may form the partition itself (for instance, if the partition merely contains the communications data structure).

The communications data structure arranged in the shared memory area can be generated in various distinctive forms. For example, the communications data structure can be generated in the form of software code.

Figure 5:
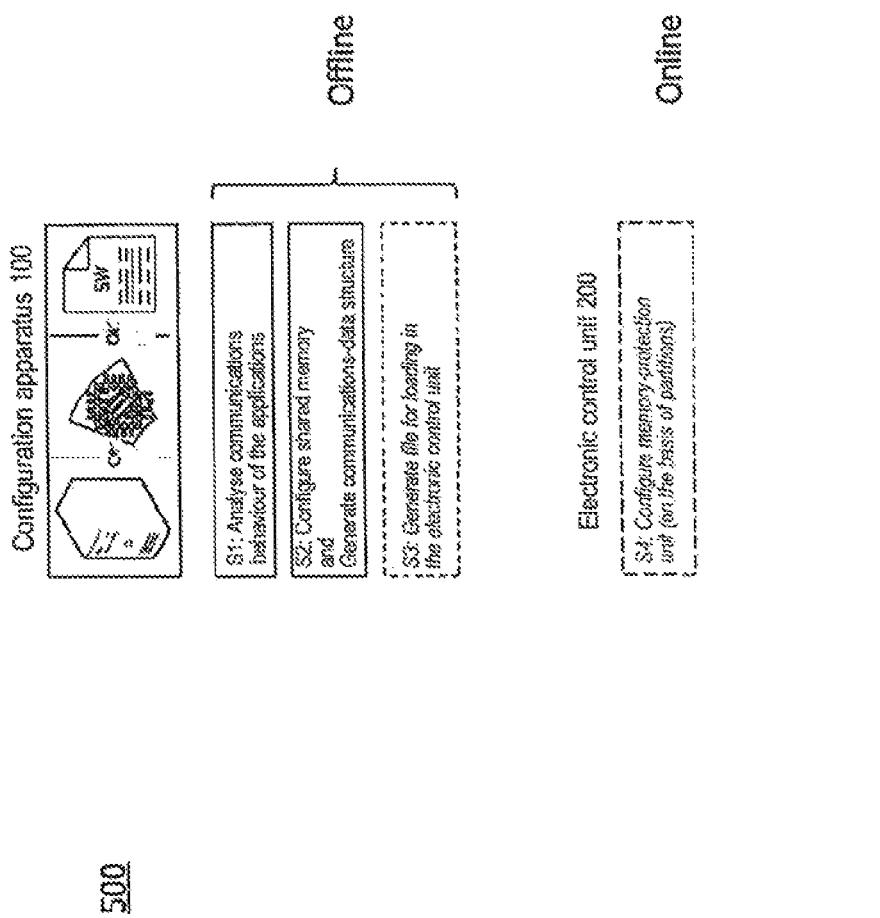
FIG. 5 a flow chart which illustrates an embodiment of an operating method for the configuration apparatus according to FIG. 2 and the electronic control unit according to FIG. 3.

In the following, an embodiment of an operating method for the configuration apparatus 100 according to FIG. 2 and also for the electronic control unit 200 according to FIG. 3 will be elucidated on the basis of the flow chart 500 of FIG. 5. The operating method comprises several steps that are carried out offline by the configuration apparatus 100, and also one or more steps that are carried out online by the electronic control unit 200. The steps carried out online are carried out during the run-time of one or more of the applications SWC1 to SWC5 in the electronic control unit 200, whereas the steps carried out offline are executed in the approach to the steps carried out online in the configuration apparatus 100.

The steps carried out offline serve to generate configuration data which configure the electronic control unit 200 for the intercommunicating applications SWC1 to SWC5. As already elucidated above with reference to FIG. 4, differing safety integrity levels have been assigned to the intercommunicating applications SWC1 to SWC5. Applications SWC1 to SWC5 have been distributed, in accordance with the respectively assigned safety integrity level in the embodiment, to partitions 1, 2 and 3.

In a first step S1, which is carried out by the analysis device 150 according to FIG. 2, the configuration apparatus 100 analyses the communications behaviour of the applications SWC1 to SWC5 assigned to the differing partitions 1, 2 and 3 amongst themselves. The analysis is carried out on the basis of communications data which (e.g. in the form of the input file 170) were received via the receiver 140.

According to a first implementation of step S1, within the framework of the analysis a writing application and at least one application reading the written data are identified, said applications not being located in the same partition. Generally, a communications ratio of 1:n (n=1, 2, ... ) between writing and reading applications may result.

According to a second implementation of step S1, the analysis yields at least two data-writing applications and an application reading the written data, said applications not all being located in the same partition. According to this implementation, a communications ratio of n:1 (n=2, 3, ... ) exists between writing and reading applications.

It should be pointed out that within the framework of the analysis in step S1 several ratios of 1:n and also, additionally or as an alternative, several ratios of n:1 in connection with differing applications can also be identified. In other words, sets of applications can be identified which exhibit a ratio of 1:n between writing and reading applications, as well as further sets of applications which exhibit a ratio of n:1 between writing and reading applications.

On the basis of the result of the analysis in step S1, in step S2 the configuration device 160 becomes active, in order to generate configuration data. In this connection, for each set of applications for which a ratio of 1:n or n:1 between writing and reading applications was ascertained, a shared memory area is configured and a communications data structure for (at least partial) arrangement in the shared memory area is generated.

In the case of a ratio of 1:n between writing and reading applications, the shared memory area is configured in the partition of the writing application. On the other hand, in the case of a ratio of n:1 the shared memory area in the memory 210 is configured outside the partitions of the applications involved. Now an example on the basis of FIG. 4. In the case of two writing applications SWC1 and SWC2 in partition 1 and partition 2, respectively, and a reading application SWC3 in partition 3, the shared memory area in this case is configured in the memory outside partitions 1, 2 and 3. For example, the shared memory area can be configured in partition 5, which has not been assigned to one of the safety integrity levels SILn and to which also not specifically no safety integrity level has been assigned.

The configuration data (inclusive of the communications data structure) generated in step S2 define, for example, the number of partitions to be established in the memory 210 of the electronic control unit 200, the start and end addresses of the partitions in the memory 210, a size of the communications data structure, and also a memory address of the communications data structure in the memory 210. The corresponding configuration data can be combined in an optional step S3 to form a file, in order to be loaded into the electronic control unit 200.

The configuration data may furthermore optionally be linked with application data of the associated applications SWC1 to SWC5. This linking may, for example, be done in such a manner that the configuration data assigned to a certain partition are linked with the application data assigned to this partition. However, it would also be conceivable to load the configuration data and the application data onto the electronic control unit 200 separately from one another.

After the configuration data and application data have been loaded onto the electronic control unit 200, the electronic control unit 200 has been configured in suitable manner for a communication among the applications SWC1 to SWC5. This communication, based on one or more of the aforementioned communications data structures, between the applications requires no system call to the operating system 240. At the same time, the memory-protection unit 230 guarantees that in the case of a communications ratio of 1:n the reading application during its run-time is given only read access, but not write access, to the corresponding communications data structure. In the case of a communications ratio of n:1, on the other hand, it is guaranteed that the writing applications during their run-time are given write access, and the reading application during its run-time is given only read access, but not write access, to the corresponding communications data structure. The corresponding configuration of the memory-protection unit 230 for realising these memory-protection concepts is undertaken online—that is to say, during the run-time of the applications SWC1 to SWC5—by means of the operating system 240 (cf. step S4 in FIG. 5).

Figure 6:
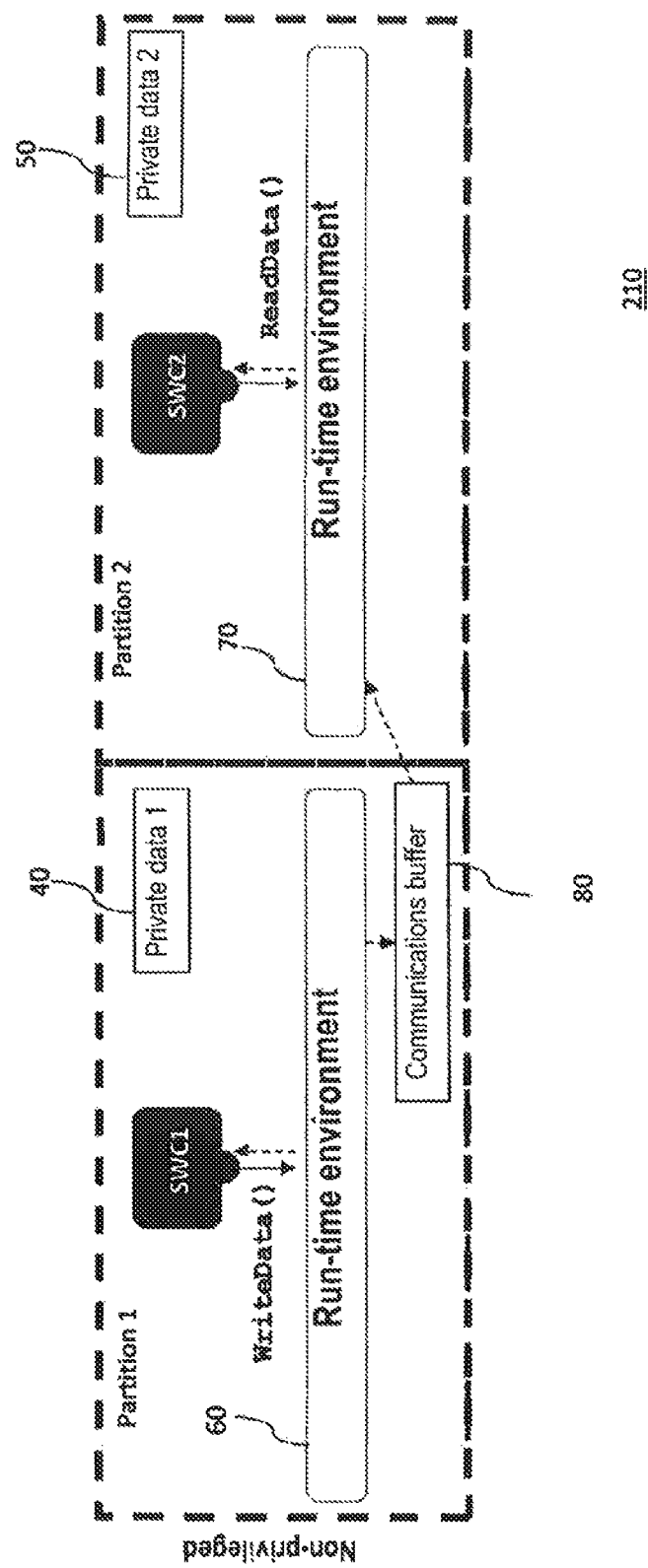
FIG. 6 a schematic diagram for illustrating the memory configuration and the memory-based communication in an electronic control unit according to a first embodiment.
Figure 7:
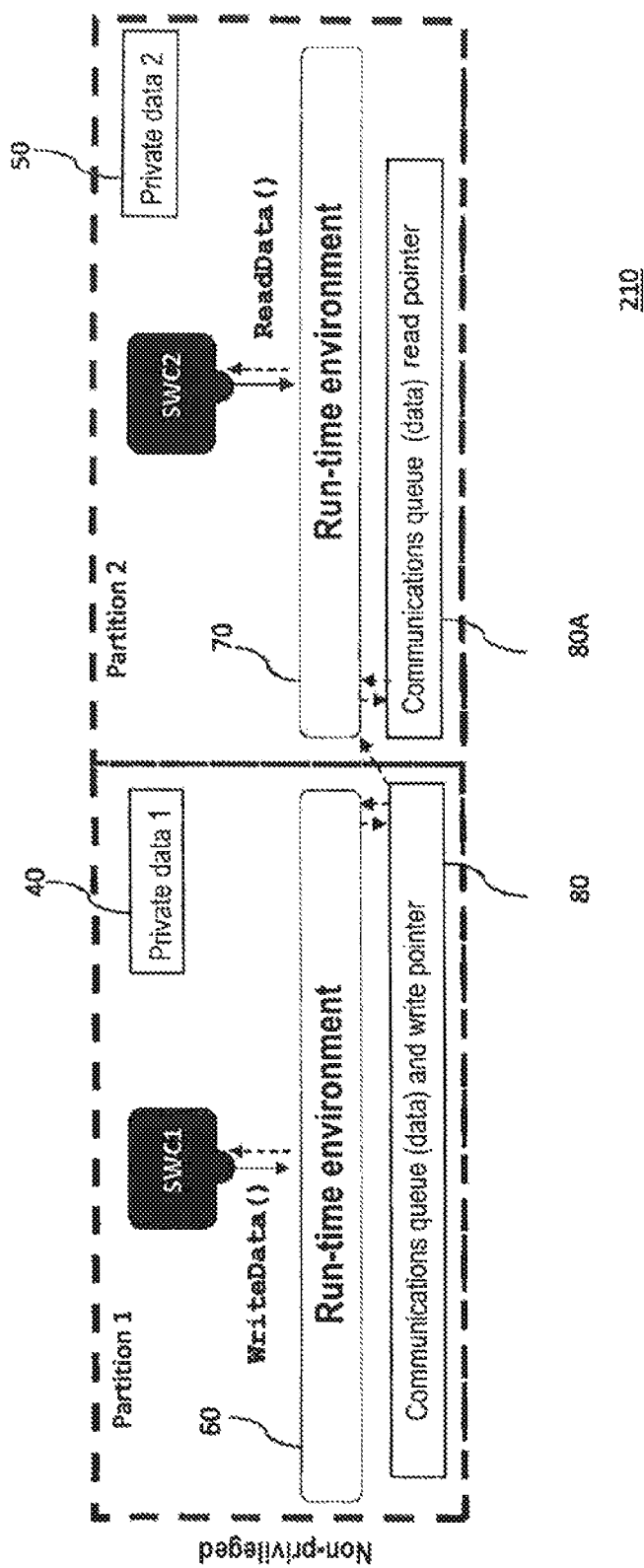
FIG. 7 a schematic diagram for illustrating the memory configuration and the memory-based communication in an electronic control unit according to a second embodiment.
Figure 8:
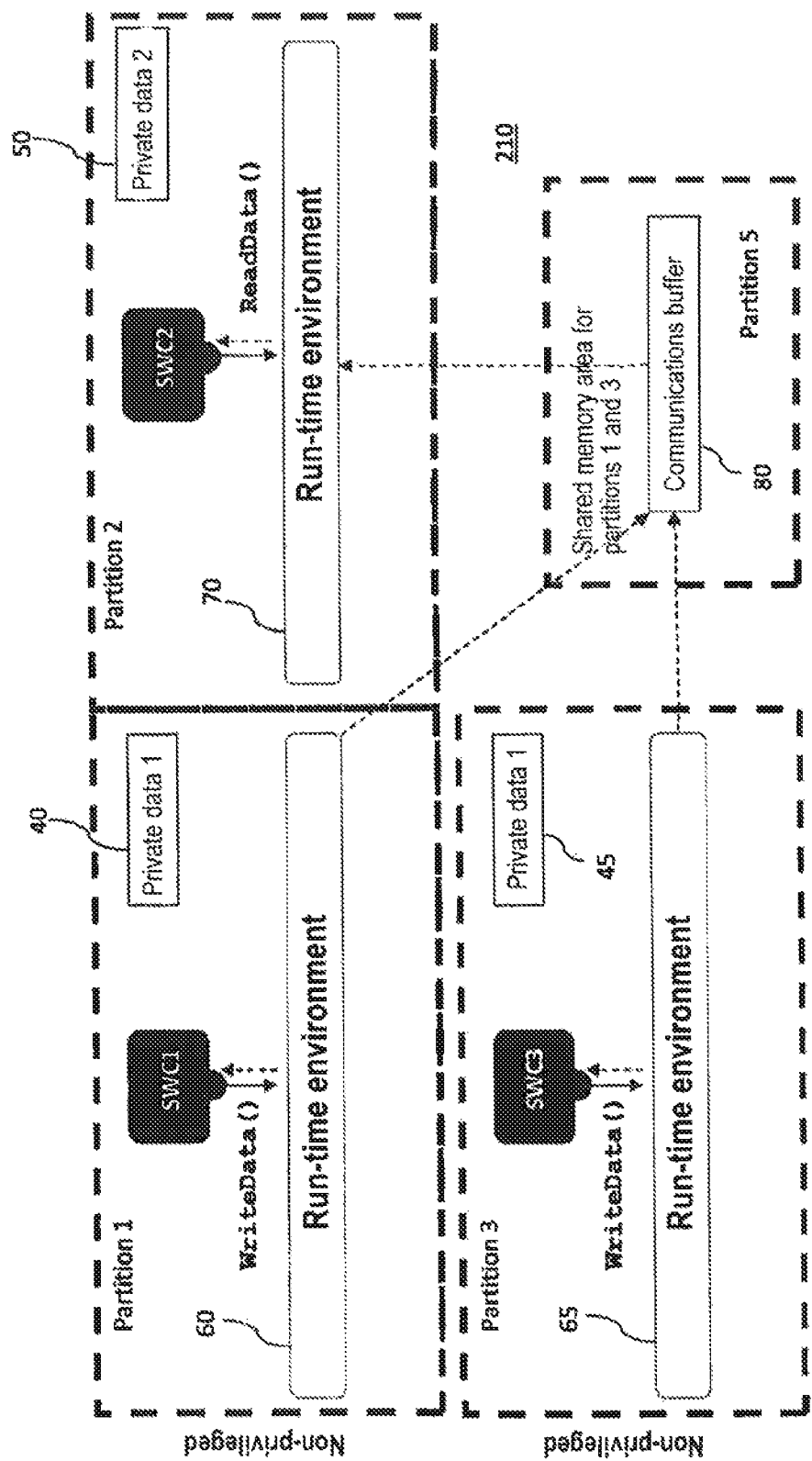
FIG. 8 a schematic diagram for illustrating the memory configuration and the memory-based communication in an electronic control unit according to a third embodiment.

In FIGS. 6 to 8 some embodiments for the configuration of the various partitions of the electronic-control-unit memory 210 both for the communications ratio of 1:n (FIGS. 6 and 7) and for the communications ratio n:1 (FIG. 8) have been represented. The examples illustrate the communication of applications that have been arranged in differing partitions, on the basis of communications data structures and without the necessity of system calls to the operating system 240. The configuration of the memory 210 according to FIGS. 6 to 8 is the result of the loading of the configuration data and of the application data into the electronic control unit 200.

FIG. 6 relates to the case of a (single) data-writing application SWC1 and also of a (single) application SWC2 reading the data written by application SWC1. As already elucidated with reference to FIG. 4, safety integrity level SIL1 has been assigned to application SWC1, whereas application SWC2 has safety integrity level SIL2. Accordingly, the two applications SWC1 and SWC2 have been arranged in separate partitions (partition 1 and partition 2), with separate run-time environments 60, 70 and separate private data 40, 50.

If the analysis device 150 of the configuration device 100 detects such a communications behaviour and such a partitioning of the two applications SWC1 and SWC2, as shown in FIG. 6 a shared memory area is configured in partition 1 of the writing application SWC1, and a communications data structure 80 is generated which has been provided in this shared memory area. In the present embodiment the communications data structure takes the form of a communications buffer memory. The communications buffer memory 80 is an area of private data from the perspective of partition 1.

For example, application SWC1 can process the signal of a wheel-speed sensor and can write it as a speed value (via a call of the assigned run-time environment 60) into the communications buffer memory 80. The speed value in the communications buffer memory 80 can be continually updated by application SWC1 (that is to say, in accordance with last-is-best semantics). Application SWC2 may be an application that outputs a driver warning if the current speed value exceeds a limiting value. For this purpose, application SWC2 can (via a call of the assigned run-time environment 70) read out the speed value written by application SWC1 into the communications buffer memory 80. The memory-protection unit 230 of the electronic control unit 200 has in this case been configured in such a manner that the reading application SWC2 during its run-time has only read access, but not write access, to the communications buffer memory 80.

FIG. 7 illustrates a scenario similar to FIG. 6, though for the case of a consuming readout of the communications buffer memory 80 by application SWC2. This means that the value last read out in the given case is deleted in the communications buffer memory 80 or becomes invalid. For this purpose the communications buffer memory 80 in the embodiment according to FIG. 7 has been configured as a queue (e.g. as a ring buffer).

The writing application SWC1 carries a write pointer in the communications queue in conventional manner. In complementary manner the reading application SWC2 has to carry a read pointer. By reason of the memory-protection concept implemented in the present embodiment, application SWC2 does not have write access to the communications queue (as first part of the communications data structure) configured in partition 1 of the writing application SWC1, in order to store its read pointer there. Therefore the read pointer is carried in a private memory area 80A (as second part of the communications data structure) in the private data area of partition 2.

In the case of two or more reading applications, for each application a separate communications queue can be set up in the area of partition 1. Furthermore, in each partition of a reading application a separate area of private data 80A for the carrying of the respective read pointer can be set up (not represented in FIG. 7).

FIG. 8 shows a configuration of the electronic-control-unit memory 210 for the case of two writing applications SWC1 and SWC3 and also of one reading application SWC2. A run-time environment 60, 70, 65 and also an area of private data 40, 50, 45 within the respective partition have been assigned respectively to applications SWC1, SWC2, SWC3.

In the case illustrated in FIG. 8, the analysis carried out by the analysis device 150 yields that the two writing applications SWC1 and SWC3 are confronted with a (single) application SWC2 reading the written data, said applications not all being located in the same partition (and consequently having differing safety integrity levels; cf. FIG. 4). For this reason, a shared memory area is configured in the memory outside partitions 1, 2 and 3 by the configuration device 160. In the present embodiment a corresponding configuration of partition 5 is undertaken here. Furthermore, a configuration-data structure in the form of a communications buffer memory 80 in partition 5 acting as shared memory area is again provided. The operating system 240 then configures the memory-protection device 230 in such a manner that the writing applications SWC1 and SWC3 during their run-time have write access, and the reading application SWC2 during its run-time has only read access, but not write access, to the communications buffer memory 80.

In the following, a more detailed embodiment of an operating method for the configuration apparatus 100 will be elucidated with references to FIG. 9. The operating method can be carried out in connection with steps S1 to S3 according to FIG. 5 and will be described in exemplary manner in the following on the basis of the memory configuration according to FIG. 8.

Figure 9:
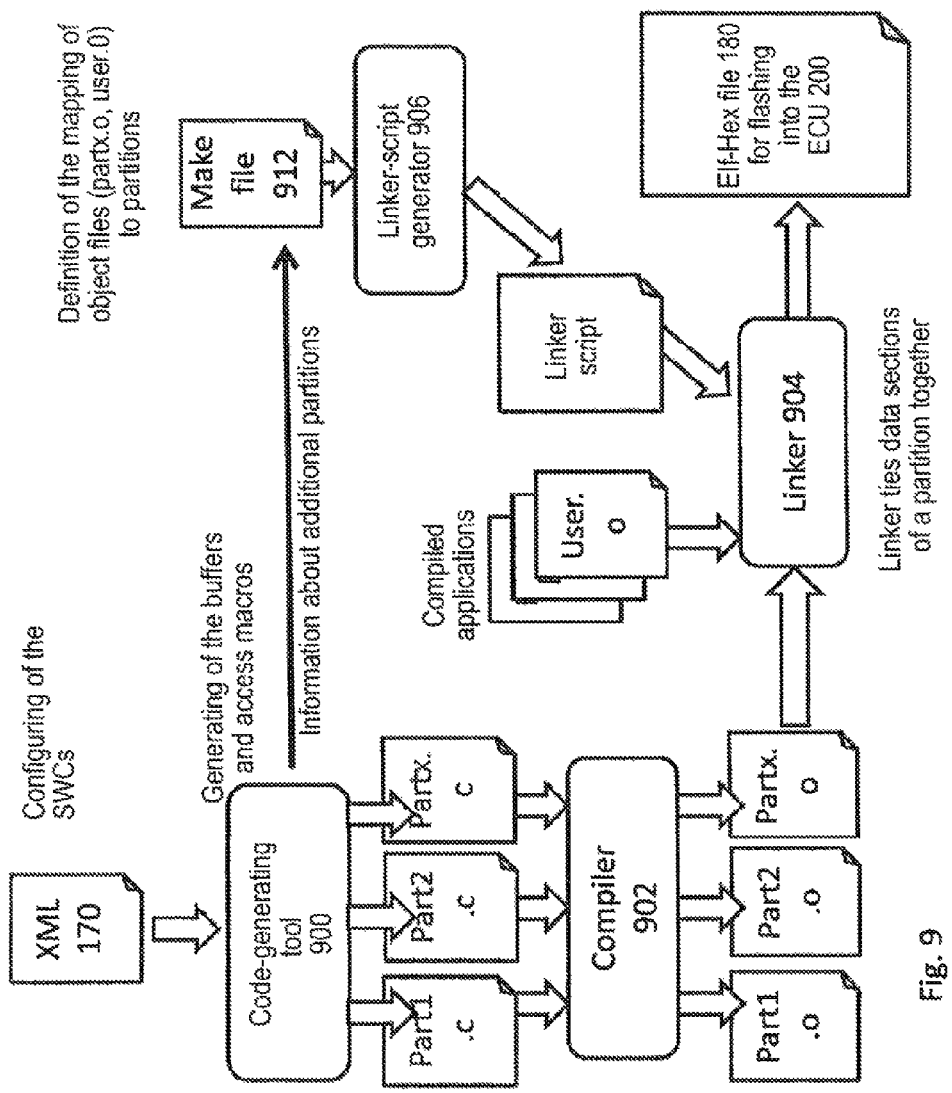
FIG. 9 a detailed diagram for illustrating an embodiment of an operating method for the configuration apparatus according to FIG. 2.

FIG. 9 shows the software components of the configuration device 100, which in interaction bring about the implementation of steps S1 to S3. These software components may, for example, have been stored in the memory 120 of the configuration apparatus (cf. FIG. 2) in the form of software code.

As represented in FIG. 9, the software components comprise a code-generating tool 900 for creating source code (here, C code), a compiler 902 for generating object code from the source code generated by the code-generating tool 900, and also a linker 904. The linker 904 is operated on the basis of a linker script which was generated by a linker-script generator 906. The linker 904 has been set up, on the basis of the linker script, to link the object code generated by the compiler 902 with further object code which corresponds to the compiled applications.

In the diagram of FIG. 2 the code-generating tool 900 performs the task of the analysis device 150 and, at least partially, the task of the configuration device 160. This corresponds to steps S1 and S2 in FIG. 5. The compiler 902 and the linker 904, in turn, execute, at least partially, the procedures of step S3 in FIG. 5.

As shown in FIG. 9, the code-generating tool 900 receives (via the receiver 140 according to FIG. 2) an input file 170, for example in the Extensible Markup Language (XML) format. Output by the linker 904 is an output file 180 for flashing into the electronic-control-unit memory 210. The output file 180 may exhibit a hexadecimal format or an ELF format (Executable and Linkable Format). In the following, the processing steps in the configuration device 100 in order to get from the input file 170 to the output file 180 will be elucidated in greater detail with reference to the exemplary memory configuration according to FIG. 8 and on the basis of pseudocode examples.

The input file 170 contains information as regards the assignment between partitions and applications, on the one hand, and also as regards the communications behaviour of the applications amongst themselves, on the other hand. In the present example (cf. FIG. 8), application SWC2 reads in data that may come either from application SWC1 or from application SWC3. Applications SWC1 and SWC3 consequently generate the data, whereas application SWC2 acts as consumer of the data. In the present example the data are to have last-is-best semantics.

In the case of the data, it may, for example, be a question of the internal temperature TEMP of a motor vehicle, which is read by an air-conditioning-system application SWC2 and is generated by two different applications SWC1 and SWC3 (e.g. in redundant manner) on the basis of temperature-sensor signals. In a pseudocode representation, the input file 170 may accordingly exhibit the following format:

```
<ECU>
    <SWC>
        <SWC-NAME>SWC1</SWC-NAME>
        <OWNPARTITION name="Part1" />
    </SWC>
    <SWC>
        <SWC-NAME>SWC2</SWC-NAME>
        <OWNPARTITION name="Part2" />
    </SWC>
    <SWC>
        <SWC-NAME>SWC3</SWC-NAME>
        <OWNPARTITION name="Part3" />
    </SWC>
    <SIGNAL>
        <NAME>TEMP</NAME>
        <SENDER>SWC1,SWC3</SENDER>
        <RECEIVER>SWC2</RECEIVER>
    </SIGNAL>
</ECU>
```

The code-generating tool 900 reads in the input file 170 and analyses, on the basis of the communications data (inclusive of the partition allocations) contained in the input file 170, the communications behaviour of the applications SWC1, SWC2 and SWC3 assigned to the differing partitions 1, 2 and 3. In this connection, the code-generating tool 900 establishes that the two data-writing applications SWC1 and SWC3 are confronted with a single data-reading application SWC2, all the applications SWC1, SWC2 and SWC3 being situated in differing partitions.

In order that the communication amongst applications SWC1, SWC2 and SWC3 includes no system calls to the operating system 240, and that, at the same time, the memory-protection concept already described above can be implemented, as shown in FIG. 8 a separate fourth partition ('partition 5') has to be configured as a shared memory area in the electronic-control-unit memory 210. Since in the present embodiment the C code that is output by the code-generating tool 900 is written to partition-specific files ("Partx.c" in FIG. 9), the code-generating tool 900 generates, besides, in each instance, its own file for partitions 1, 2 and 3 (with a run-time environment for the respective application SWC1, SWC2 or SWC3), a further file with the data for the communications data structure 80 in the additional, fourth partition. The corresponding file for the fourth partition configured as shared memory, for example with the file name TEMP.c, could take the form of buffer memory and in this case could look as follows:

```
TEMPType    BufferTEMP;
```

Furthermore, the code-generating tool 900 generates macros, in order to be able to access the internal-temperature data via the data name TEMP. These macros could then look as follows:

```
#define SendTEMP(x)      BufferTEMP =x
#define ReceiveTEMP( )   BufferTEMP
```

In a next step, the compiler 902 translates the source-code files generated in partition-specific manner by the code-generating tool 900 into corresponding object-code files ("Partx.o" in FIG. 9). Besides the files generated by the code-generating tool 900, the compiler 902 also translates application files which on the electronic control unit 200 implement the actual functions of applications SWC1, SWC2 and SWC3 ("User.o" in FIG. 9). These application files contain calls for the data of TEMP—that is to say, for example, SendTEMP(x) or ReceiveTEMP(x).

As shown in FIG. 9, besides the source-code files the code-generating tool 900 also generates configuration information as to how many new partitions have been established (here: one partition, namely the additional fourth partition) and which source-code files are to be mapped into which partition. This information can be output as directly processable information (e.g. as a makefile fragment 912), in order to be processed by the linker-script generator 906. In concrete terms, in the makefile fragment 912 variables are set which the linker-script generator 906 utilises in order to generate a valid linker script. For the exemplary case illustrated in FIG. 8, the makefile fragment may look as follows:

```
OBJS_Part1= SWC1.o ...
OBJS_Part1RWRegion= TEMP.o
OBJS_Part2= SWC2.o ...
OBJS_Part3= SWC3.o ...
OBJS_Part3RWRegion= TEMP.o
OBJS_Part4= TEMP.o
```

The linker-script generator is subsequently triggered, and a list of the variables (OBJS_xxx) is passed to it. The linker script generated by the linker-script generator 906 combines the respective objects of a partition (from OBJS_Part<Nr>) into a contiguous section. Over and above that, section addresses are generated (from OBJS_Part<Nr>RWRegion) and are saved as linker symbols. These linker symbols can later be referenced by the operating system 240 if the latter reconfigures the memory-protection unit 230 during a change of task or change of thread.

Subsequently, all the object files are tied together by the linker 904 on the basis of the linker script and are configured. By means of the linker script, it is established in the form of configuration information where the individual sections of an (e.g. partition-specific) object (application code, application data, run-time-environment code, communications data based on communications data structure etc.) are located. The absolute file resulting from this can, subsequent thereto, be loaded into to the electronic control unit 200 and triggered, in order to bring about the communications behaviour, illustrated in FIG. 8, between applications SWC1, SWC2 and SWC3.

As results from the description of the embodiments (cf. e.g. FIGS. 6 to 8), a 'system is trap' can be avoided, since for the purpose of communication between the applications no system call is any longer necessary. Rather, the applications communicate by using a communications data structure. As described above, this data structure may have been provided in an area of private data—to be specific, either in a partition of the writing application (case 1:n) or in a dedicated partition (case n:1).

Figure 1:
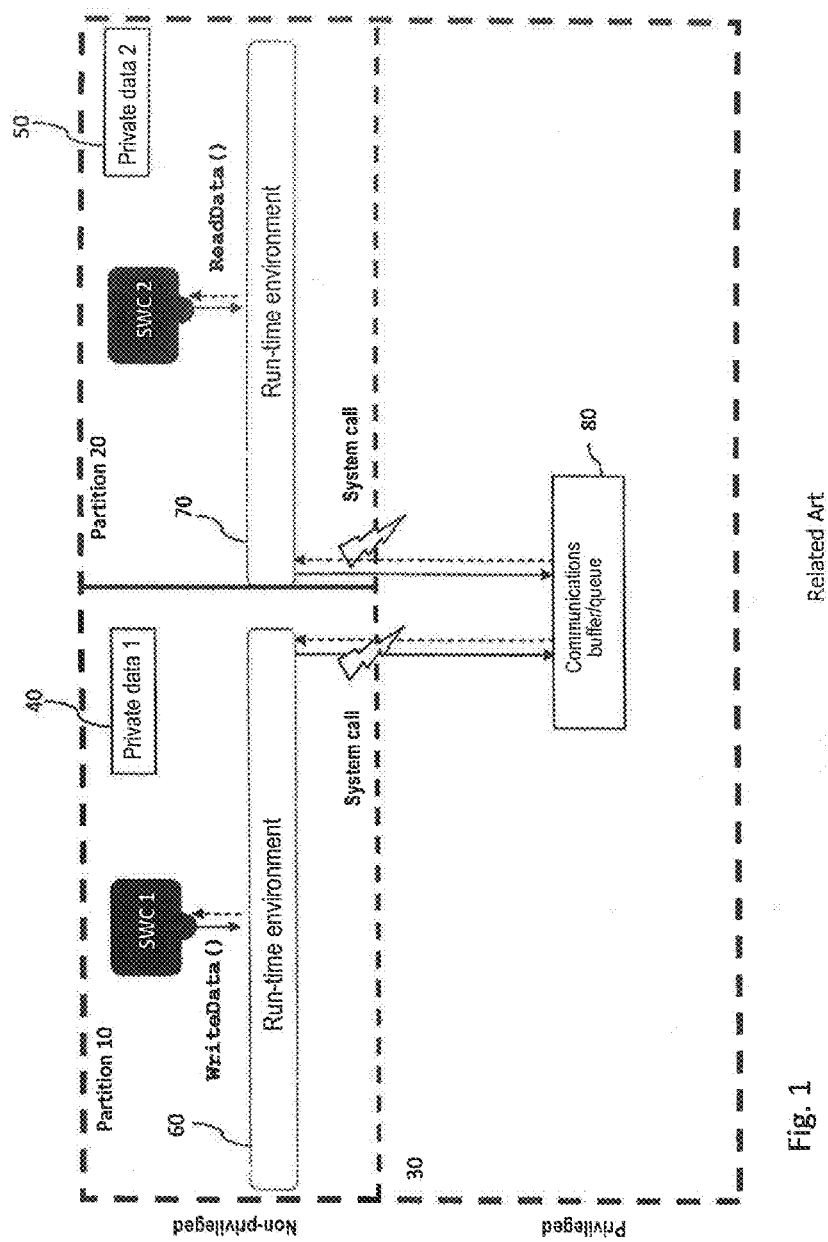
FIG. 1 a memory-based communication between applications in a conventional electronic control unit with memory partitioning.

Overall, from the perspective of an electronic-control-unit processor the computation effort associated with the communication between the applications can be reduced (in comparison with the scenario shown in FIG. 1 with system calls). The computation effort is comparable to a system without partition boundaries (and without the enforcement—associated therewith in the embodiments—of safety integrity levels).

Furthermore, by reason of the elimination of the system calls, no additional wrapper functions are needed for this. This means that the scope of the code can be kept smaller, and the memory requirement in the electronic control unit is not increased unnecessarily.

It will be understood that the above description of embodiments is merely of exemplary nature. A person skilled in the art can therefore alter, supplement and combine the embodiments within the scope of his/her specialised knowledge. The invention is defined solely by the range of protection of the following claims.

The invention claimed is:

1. A method for computer-assisted configuration of an electronic control unit for intercommunicating applications, wherein a memory assigned to the electronic control unit has been split up or is split up into partitions, and wherein at least a first application with a first safety integrity level has been assigned to a first partition, and at least a second application with a second safety integrity level, different from the first safety integrity level, or with no safety integrity level, has been assigned to a second partition, comprising the following steps:
   analysing a communications behaviour of the at least the first application assigned to the first partition and the at least the second application assigned to the second partition amongst themselves, in order to identify a data-writing application that writes data and at least one data-reading application that reads the data written by the data writing application, said data-writing application and said at least one data-reading application not being located in a same partition; and
   configuring, based on the analysed communications behaviour, a shared memory area in the partition of the data-writing application, and generating a communications data structure for a communication between the data-writing application and the data-reading application, the communications data structure being provided for at least partial arrangement in the shared memory area,
   wherein the analysing and the configuring are carried out offline and a memory-protection unit of the electronic control unit is configured in such a manner that the reading application during its run-time is given only read access, but not write access, to the communications data structure.

2. The method according to claim 1, wherein the communication between the two applications is based on a communications data structure configured as a queue, and wherein a first part of the communications data structure is configured in the shared memory area in the partition of the writing application, and a second part of the communications data structure is configured in another memory area outside the partition of the writing application.

3. The method according to claim 2, wherein the other memory area is formed in the partition of the reading application.

4. The method according to claim 2, wherein the first part of the communications data structure is configured for storing at least the written data, and the second part of the communications data structure is configured for storing at least one read pointer.

5. The method according to claim 2, wherein two or more applications reading the written data have been provided, and wherein for each reading application a separate communications data structure configured as a queue is provided.

6. The method according to claim 5, wherein the two or more applications reading the written data have been assigned to differing partitions.

7. The method according to claim 1, further including the step of receiving information relating to the assignment between partitions and applications and also relating to the communications behaviour of the applications, the analysing of the communication paths being undertaken on the basis of the received information.

8. The method according to claim 1, wherein the configuring of the shared memory area and the generating of the communications data structure are undertaken in connection with creating of compilable partition-specific configuration data.

9. The method according to claim 8, further including compiling the configuration data and compiling application data containing the applications, wherein the application data contain calls to data to be read and written, and linking the compiled configuration data with the compiled application data.

10. The method according to claim 9, wherein the linking is carried out on the basis of information that specifies which application data are to be mapped onto which partitions.

11. The method according to claim 9, further including loading the linked data into the electronic control unit.

12. The method according claim 1, wherein the applications have been configured to communicate in accordance with an AUTOSAR specification.

13. A computer-program product with program-code means for implementing the method according to claim 1 when the computer-program product is executed on one or more processors.

14. The Computer-program product according to claim 13, stored on a storage medium.

15. An electronic control unit, configured by the method according to claim 1.

16. A method for computer-assisted configuration of an electronic control unit for intercommunicating applications, wherein a memory assigned to the electronic control unit has been split up or is split up into partitions, and wherein at least one application with a first safety integrity level has been assigned to a first partition, at least one application with a second safety integrity level, different from the first safety integrity level, has been assigned to a second partition, and at least one application with a third safety integrity level, different from the first and second safety integrity levels, or with no safety integrity level, has been assigned to a third partition, comprising the following steps:
   analysing a communications behaviour of the applications assigned to the differing partitions amongst themselves, in order to identify at least two data-writing applications that respectively write data and a data-reading application that reads the data written by the two data writing applications, said applications not all being located in a same partition;

configuring, based on the analysed communications behaviour, a shared memory area in the memory outside the first, second and third partitions, and generating a communications data structure for a communication between the data-writing applications and the data-reading application, the communications data structure being provided for at least partial arrangement in the shared memory area, wherein the analysing and the configuring are carried out offline and a memory-protection unit of the electronic control unit is configured in such a manner that the writing applications during their run-time are given write access, and the reading application during its run-time is given only read access, but not write access, to the communications data structure.

17. The method according to claim 16, wherein the shared memory area is configured in a fourth partition.

18. The method according to claim 16, wherein the shared memory area is configured as a buffer memory or as a queue.

19. An apparatus for configuring an electronic control unit for intercommunicating applications, wherein a memory assigned to the electronic control unit has been split up or is split up into partitions, and wherein at least one application with a first safety integrity level has been assigned to a first partition, and at least one application with a second safety integrity level, different from the first safety integrity level, or with no safety integrity level, has been assigned to a second partition, comprising:

an analysis circuit which has been designed for analysing a communications behaviour of the applications assigned to the differing partitions amongst themselves, in order to identify a data-writing application that writes data and at least one data-reading application that reads the written data, said applications not being located in a same partition;

a configuration circuit which has been set up for configuring, based on the analysed communications behaviour, a shared memory area in the partition of the writing application and for generating a communications data structure for a communication between the data-writing application and the data-reading application, the communications data structure having been provided for at least partial arrangement in the shared memory area; and wherein the analysing and the configuring are carried out offline and a memory protection unit of the electronic control unit is configured in such a manner that the reading application during its run-time is given only read access, but not write access, to the communications data structure.

20. An apparatus for configuring an electronic control unit for intercommunicating applications, wherein a memory assigned to the electronic control unit has been split up or is split up into partitions, and wherein at least one application with a first safety integrity level has been assigned to a first partition, at least one application with a second safety integrity level, different from the first safety integrity level, has been assigned to a second partition, and at least one application with a third safety integrity level, different from the first and second safety integrity levels, or with no safety integrity level, has been assigned to a third partition, comprising:

an analysis circuit which has been set up for analysing a communications behaviour of the applications assigned to the differing partitions amongst themselves, in order to identify at least two data-writing applications that respectively write data and a data reading application that reads the written data, said applications not all being located in a same partition;

a configuration circuit which has been set up for configuring, based on the analysed communications behaviour, a shared memory area in the memory outside the first, second and third partitions and for generating a communications data structure for a communication between the data-writing applications and the data-reading application, the communications data structure having been provided for at least partial arrangement in the shared memory area; and wherein the analysing and the configuring are carried out offline and a memory protection unit of the electronic control unit is configured in such a manner that the reading application during its run-time is given only read access, but not write access, to the communications data structure.

21. An apparatus for configuring an electronic control unit for intercommunicating applications, wherein a memory assigned to the electronic control unit has been split up or is split up into partitions, and wherein at least one application with a first safety integrity level has been assigned to a first partition, and at least one application with a second safety integrity level, different from the first safety integrity level, or with no safety integrity level, has been assigned to a second partition, comprising:

a memory storing executable software code; and a processor operatively coupled to the memory, the processor executing the executable software code causing the processor to be configured as:

an analysis device which has been designed for analysing a communications behaviour of the applications assigned to the differing partitions amongst themselves, in order to identify a data-writing application that writes data and at least one data-reading application that reads the written data, said applications not being located in a same partition; and a configuration device which has been set up for configuring, based on the analysed communications behaviour, a shared memory area in the partition of the writing application and for generating a communications data structure for a communication between the data-writing application and the data-reading application, the communications data structure having been provided for at least partial arrangement in the shared memory area, wherein the analysing and the configuring are carried out offline and a memory protection unit of the electronic control unit is configured in such a manner that the reading application during its run-time is given only read access, but not write access, to the communications data structure.

22. An apparatus for configuring an electronic control unit for intercommunicating applications, wherein a memory assigned to the electronic control unit has been split up or is split up into partitions, and wherein at least one application with a first safety integrity level has been assigned to a first partition, at least one application with a second safety integrity level, different from the first safety integrity level, has been assigned to a second partition, and at least one application with a third safety integrity level, different from the first and second safety integrity levels, or with no safety integrity level, has been assigned to a third partition, comprising:

a memory storing executable software code; and a processor operatively coupled to the memory, the processor executing the executable software code causing the processor to be configured as:

an analysis device which has been set up for analysing a communications behaviour of the applications assigned to the differing partitions amongst themselves, in order to identify at least two data-writing applications that respectively write data and a data reading application that reads the written data, said applications not all being located in a same partition; and a configuration device which has been set up for configuring, based on the analysed communications behaviour, a shared memory area in the memory outside the first, second and third partitions and for generating a communications data structure for a communication between the data-writing applications and the data-reading application, the communications data structure having been provided for at least partial arrangement in the shared memory area, wherein the analysing and the configuring are carried out offline and a memory protection unit of the electronic control unit is configured in such a manner that the reading application during its run-time is given only read access, but not write access, to the communications data structure.

\* \* \* \* \*